INVENTOR
DAVID W. ROBINSON

United States Patent Office 3,686,134
Patented Aug. 22, 1972

3,686,134
THERMALLY EXPANDING VERMICULITE AND OTHER THERMALLY EXPANDABLE MATERIALS, UTILIZING SAID MATERIALS AS CARRIER AND THE PRODUCTS THEREOF
David W. Robinson, Libby, Mont., assignor to
W. R. Grace & Co., Cambridge, Mass.
Continuation of application Ser. No. 845,762, July 29, 1969, which is a continuation-in-part of application Ser. No. 527,765, Feb. 16, 1966, now Patent No. 3,459,531. This application Feb. 25, 1971, Ser. No. 118,712
Int. Cl. C04b *31/26*
U.S. Cl. 252—378                                8 Claims

ABSTRACT OF THE DISCLOSURE

The expansion of vermiculite is enhanced and more efficiently performed by preheating the vermiculite while maintaining its water content prior to thermal expansion. In a preferred embodiment, the vermiculite is preheated in a saturated atmosphere and then expanded in a liquid heat carrier. In another aspect, a slight increase in moisture content of the vermiculite is accomplished. By this invention, the quantity of liquid heat carrier taken up by the vermiculite is increased as well as the degree of expansion.

CROSS-REFERENCE TO RELATED APPLICATIONS

This is a continuation of Ser. No. 845,762 filed July 29, 1969, and now abandoned, which was a continuation-in-part of application Ser. No. 527,765, filed Feb. 16, 1966, now U.S. Pat. No. 3,459,531.

BACKGROUND OF THE INVENTION

Figure 1:
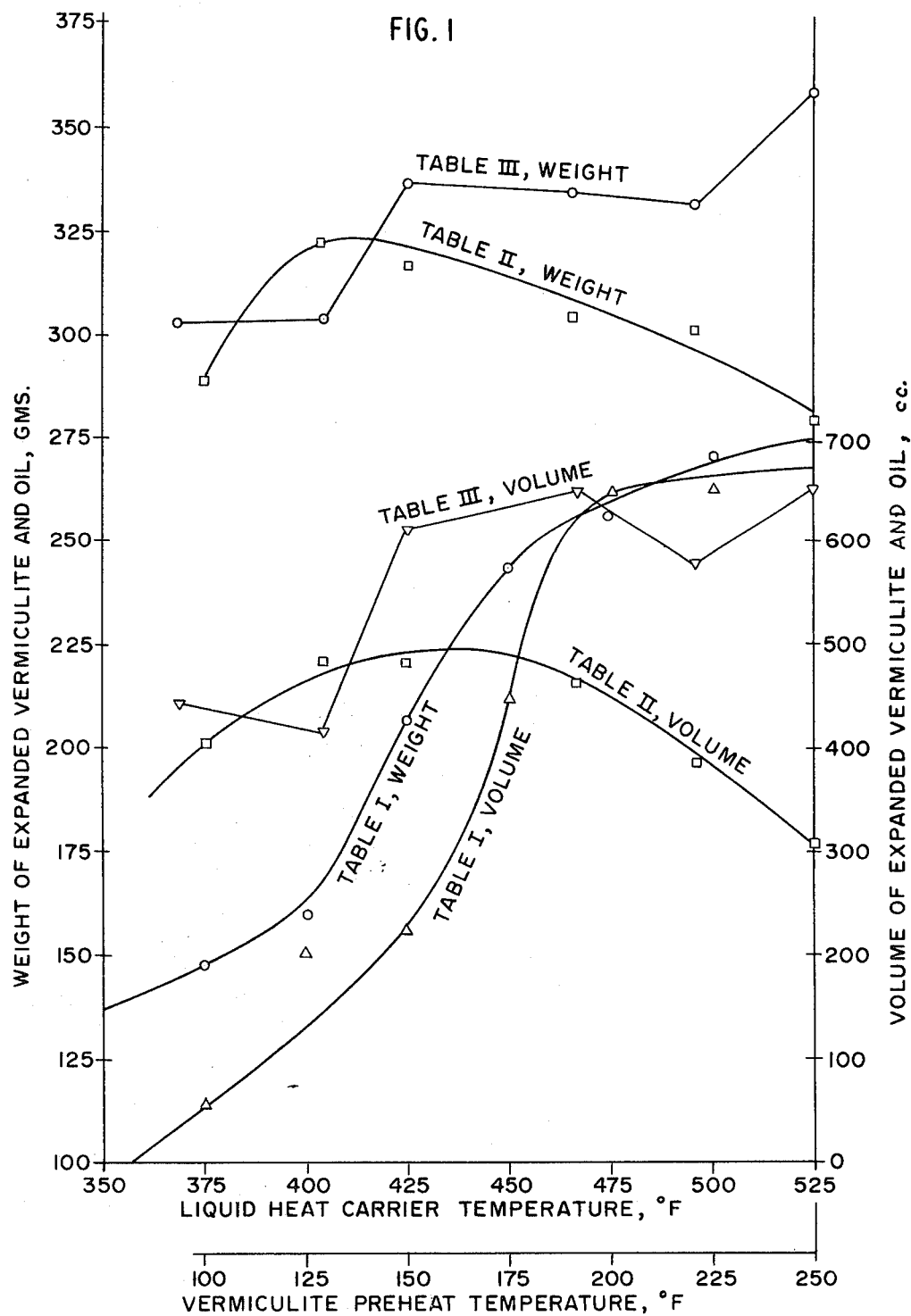
FIG. 1 is a graph of the data tabulated in Tables I–III.

This invention relates to an improved method of expanding vermiculite and other thermally expanding materials, incorporating materials into the thermally expanding materials during their expansion, and utilizing the thermally expanded material as a carrier for the materials so incorporated, and to the thermally expanded products.

The following abbreviations are used in this application. 24–12–0, 20–10–10 and similar series which represents the grade or analysis of a fertilizer. These and similar series represent the N-P-K or nitrogen-phosphorus-potash values of a fertilizer expressed as the ratio in weight equivalent of N-P$_2$O$_5$-K$_2$O. The phosphorus is expressed as P$_2$O$_5$ and the potash as K$_2$O even though the elements may actually be present in other chemical forms.

In summary, a vermiculite or like thermally expanding material is expanded by preparing a mixture of a non-gaseous heat carrier and the thermally expanding material. The non-gaseous heat carrier is heated to a temperature above 212° F. The thermally expanding material is expanded in the above 212° F. heat carrier. Particularly advantageous results are seen if the vermiculite is preheated while preventing the escape of water from the particles, and in this preheated condition, is mixed into the liquid heat carrier.

In one preferred form, a 20–10–10 fertilizer is prepared by making a 450–500° F. molten salt mix of 4 parts potassium nitrate, 3 parts monoammonium phosphate, and 8 parts ammonium nitrate in a melting pot. Unexpanded No. 3 vermiculite in the amount of 15% by weight of the combined vermiculite-salt mix weight is added to the molten salt mix while the mixture is mildly agitated. After the vermiculite has expanded and taken up substantially all of the molten salts, the plastic mass is removed from the melting pot. The mass is placed on a cool surface, broken up and screened to size.

By way of specific illustration of a particular embodiment of my invention, my invention will first be described as it is utilized in connection with the production of certain plant nutrient products, although, it is to be clearly understood that this is an illustrative embodiment only and is not to be construed in a limiting sense. Thereafter I will describe an embodiment wherein the condition of the vermiculite is controlled prior to and upon immersion in the liquid heat carrier.

Vermiculite is a thermally expanding material that is a very satisfactory agricultural material. It has been exfoliated and used as an ingredient in dry blend fertilizers to prevent hard caking and as a soil conditioner. It has also been put to other agricultural uses, for example, vermiculite is used as a rooting medium for propagating cuttings.

Vermiculite is a micaceous mineral, chemically identified as a hydrated magnesium-aluminum-iron silicate and characterized by a platelet structure which exfoliates or expands when heated or subjected to various chemical treatments so as to be increased to several times its original size and trap within itself thousands of minutely sized air cells. The mineral occurs naturally in an unexpanded state, and is mined in a conventional manner.

Since vermiculite as it is mined in the form of vermiculite ore is associated with other minerals as impurities, the crude vermiculite ore, after being reduced to particle size, has generally been beneficiated by various concentrating methods well known in the art wherein the gangue material is separate from the vermiculite particles as much as possible. After the vermiculite is separated from the gangue it is usually screened into a number of component sizes or grades. These are normally shipped to facilities located near the site of ultimate use for expansion or exfoliation. Some vermiculite is used in unexpanded form.

In the past, vermiculite has been expanded in most instances by dropping the milled vermiculite ore in a continuous stream through a furnace, the chamber temperature of which generally ranges from about 1400 to 2200° F. Incomplete expansion has been obtained when the vermiculite was subjected to furnace temperatures as low as 800° F. Chemical methods of expanding vermiculite have also been used in the past. The chemical methods of expanding vermiculite are generally relatively slow compared to the thermal methods. In one chemical process for expanding vermiculite, the vermiculite is submerged in a hydrogen peroxide bath to bring about expansion. An improvement in the furnace method of expanding vermiculite the vermiculite has been subjected to saline solution baths, followed by washing with fresh water that was heated to 150° F. This increased the water content of the vermiculite and expansion was increased to 125% of that normally achieved. The saline solution bath and fresh water washing treatment brings about a small swelling of the vermiculite, about a 54% increase in size over untreated and unexpanded vermiculite.

Vermiculite has also been subjected to sulfuric acid baths in the past. The acid leaches out practically all basic constituents of the ore leaving a highly porous silica residue that retains the flaky laminar structure of the ore and exhibits no observable expansion of the vermiculite particles.

In the past, when vermiculite was used as a carrier it was usually expanded and then the material to be carried by the vermiculite was sprayed or poured on the expanded vermiculite particles. Depending upon the nature of the material, the material either adhered to the outside of the vermiculite particles or filled the interstices of the expanded vermiculite particles or both.

In practicing my invention, the following procedural steps are normally followed, although in certain instances some of the steps can be combined. First, a hot fluid mixture of the material that is to be combined with the vermiculite is prepared and heated preferably to a temperature of 400 to 550° F., and for good results at least to 320° F. This hot fluid is moderately stirred while finely divided vermiculite is added at a rate that will permit the vermiculite to submerge almost immediately in the hot fluid. The vermiculite is preferably added in an amount constituting 5 to 20%. The vermiculite should be number 3 or number 4 vermiculite for best results. Number 3 vermiculite is predominately through an 8 mesh U.S. Standard screen but not a 16 mesh U.S. Standard screen. Number 4 vermiculite is predominately through a 16 mesh U.S. Standard screen but not a 30 mesh U.S. Standard screen.

The hot plastic mass which includes the expanded vermiculite and the adsorbed hot fluid mixture is cooled, hardened and broken up. Then it is screened to size for shipment or use.

In one preferred form of my invention I prepare a molten liquid mix that is solid at normal ambient temperature, about 0–100° F. This can be done using the following materials which have excellent fertilizer or agricultural nutrient value: potassium nitrate, monoammonium phosphate, ammonium nitrate, monopotassium phosphate, sodium nitrate, calcium nitrate and magnesium nitrate and any other material that has a eutectic melting point in combination with one or more of the listed salts under 500° F., stability at that temperature and that contains valuable primary or trace elements suitable for fertilizer use.

While the size of the unexpanded vermiculite that is to be used is not very critical, the size does effect the quantity of vermiculite required to take up the liquid phase. When No. 3 vermiculite was used a quantity equaling 10 to 15% by weight of the final product weight was required. When No. 4 vermiculite was used from 15 to 20% by weight was required. Of course, if the particle size is much less than through 100 mesh U.S. Standard screen there will not be sufficient interstices to effectively take in the molten salts and bring about the desired degree of expansion and so the process cannot be carried out in a desirable manner. Relatively low quality vermiculite has been used in this process with excellent results. So long as the vermiculite has good expansion qualities there does not seem to be any direct relationship between the quality of the vermiculite and its suitability for use in this process. For example, the friability of the vermiculite has not been found to result in any significant difference in the quality of the product.

A wide range of N-P-K ratios can be obtained practicing this process with ammonium nitrate, potassium nitrate and monoammonium phosphate salt melts. In some instances, the use of monopotassium phosphate in the salt melt increases the number of formulations possible and makes formulation simpler. Some of the fertilizer grades that can be obtained are shown in Table I.

TABLE I

[Include proportions shown with 15% vermiculite No. 3 on an end product weight basis]

| Grade | N | 16 | 20 | 22 | 24 | 22 | 25 | 16 | 21 | 18 |
|---|---|---|---|---|---|---|---|---|---|---|
|  | P | 14 | 10 | 8 | 12 | 22 | 8 | 14 | 14 | 9 |
|  | K | 16 | 10 | 8 | 0 | 0 | 0 | 16 | 7 | 18 |
| Ammonium nitrate (35% N), parts | | 2 | 8 | 9 | 16 | 13 | 166 | 3 | 11 | 9 |
| Monoammonium phosphate (12-61-0), parts | | 2 | 3 | 2 | 5 | 9 | 31 | | 1 | 2 |
| Potassium nitrate (13-0-44), parts | | 3 | 4 | 3 | | | | 1 | | 8 |
| Monopotassium phosphate (0-51-34), parts | | | | | | | | 2 | 4 | 2 |

In some instances, it is desirable to use the raw ingredients that are compounded to make the higher quality salts rather than the more expensive salts in preparing the melt materials. For example, on occasion it is desirable to charge 75% wet process phosphoric acid or 85% furnace acid into the melting vessel and ammoniate the acid with about 4.8 lbs. of ammonia per unit of $P_2O_5$ (1 unit of $P_2O_5$ is 1% ton) to produce monoammonium phosphate. The heat of reaction from ammoniation raises the temperature of the ammoniated phosphoric acid and if any water remains in the monoammonium phosphate, which is a solid at room temperature, the water is evaporated by the time the temperature is raised to 350° F. Formulations that include monoammonium phosphate are given in Table I.

The B.t.u.'s of heat required to carry out the process with a molten salt melt are substantially under the number that would be required to produce a dry vermiculite fertilizer product if a material that is a liquid at ambient temperatures is used. For example, only 45 B.t.u.'s are required to melt 1 pound of potassium nitrate as compared to approximately 1000 B.t.u.'s being required to vaporize 1 pound of water. Heat transfer in the melt is excellent compared to that of hot gas, as evidenced by the fact that vermiculite exhibits excellent expansion at 400 to 450° F. in the salt melt while temperatures of 1600 to 2000° F. are required in hot gas furnace treatments. The molten salts act as an excellent heat carrier or conductor to bring about expansion of the thermally expanding vermiculite.

When salt melts are used, only ambient cooling is needed because in salt melts, such as the ones described by way of example, any water which may have been present is evaporated in the melting process and the molten materials solidify at temperatures above 200° F. The molten mass may be cooled by dispersing the mass in a tower and allowing the mass to harden and then breaking the mass up in a breaker.

In either instance, for normal use, it would be contemplated that the particles would need to be screened to size. Of course, a person skilled in the art could readily provide other means of cooling and granulating the mass.

Generally speaking, the process can be adapted to continuous or batch operation. In the ordinary situation it is only necessary to maintain physical and chemical properties of the mass in substantially the desired ratios and the temperature between 400 and 450° F. to produce an excellent product. It is generally not necessary to maintain other operating conditions or the conditions of granulation at optimal levels. In addition, the equipment used need not be of a highly sophisticated nature.

The products produced in accordance with the invention have been observed to have a high density and hardness of particle that would indicate a very complete penetration of the vermiculite lattice by the salt melt. Even though many of the materials incorporated into the vermiculite are quite hygroscopic and have a pronounced tendency to cake when used in fertilizers, the product produced by this invention has been found to remain perfectly free flowing even when left open in high humidity. The reduction in hygroscopicity has been such that the product develops no stickiness when it contains materials that are separately very hygroscopic. The product has a low water content after granulation without requiring additional processing to further dry it out. It is believed that when a granular nitrate fertilizer is prepared according to this invention the explosion hazard is reduced. The product also tends to be very resistant to lumping and reagglomeration. Even a straight ammonium nitrate-vermiculite product exhibits good granular properties. Generally, the individual particles are of a substantially homogeneous composition and therefore there is no segregation of the ingredients.

The bulk density of the product generally varies between about 40 and 60 pounds per cubic foot. This is not a light weight product, but the inherent tough structure appears to be ideal for use in cyclone applicators. The products have been found to have a very firm particle structure. After screening they are relatively dust free and remain dust free.

Generally, a very low percentage of fines is produced and these fines can be readily recycled by feeding them into the mass during processing. The particle size of the product is to a considerable extent determined by the particle size of the unexpanded vermiculite. When the mass is broken up as it solidifies the weakest points and the points most likely to fracture are between the particles of the original vermiculite where the particles are stuck together. If solidification is not complete at the time of granulation this separation is particularly easy. Thus, unless special means are to be used to further reduce the particles sizes, the end product particles will generally be about the same size as the expanded particles of the original vermiculite. In the usual procedure some of the expanded vermiculite particles are broken during processing, some salt particles are broken away from the vermiculite and some agglomeration of multiple particles occurs, but the individual vermiculite sized particles are predominant if care is taken to properly break the particles away from one other, using the right amount of mechanical breaking action at the right stage of their solidification. For example, No. 3 vermiculite which is predominantly through 8 and on 16 U.S. Standard mesh screen usually produces a granulated fertilizer that has a particle size of predominantly through 8 and on 16 U.S. Standard mesh screen.

My invention provides a means of producing fertilizers having desirable physical properties that are substantially free of non-nutrient ions such as Cl⁻ and Na⁺. Under conditions in which the soil does not have a good natural leach rate the non-nutrient ions contained in most dry, bulk blended fertilizers can accumulate in the soil and build up high salt levels that are toxic to plants. The essential nutrient ions are removed from the soil by the plants and fertilization to replace these essential nutrients will continually add the non-nutrient ions which are not removed by the plants. This is particularly important in fertilizing crops that are very sensitive to high salt residues in the soil, tobacco, for example, A premium price is paid for low salt residue fertilizers when the fertilizer is to be used on a salt sensitive crop. In some cases the non-nutrient ions build up to such levels, particularly on irrigated land, that artificial leaching is necessary. This leaching not only consumes valuable water but leaches out nutrient salts with the non-nutrient salts.

Furthermore, it is believed that the leaching pattern of the product produced by this invention is very desirable for most uses where excess leaching is a problem. The salts adhering to the outside of the vermiculite particles dissolve at a very rapid rate while the salts in between the layers of the exfoliated vermiculite appear to dissolve more slowly. The salts in between the vermiculite platelets appear to dissolve only as water is able to penetrate in between the platelets by slowly dissolving the salts as it penetrates inwardly.

Many other materials can, of course, be incorporated into vermiculite using the teachings of this invention. For example, elemental sulfur can be introduced into vermiculite in the manner described in Example 3. If a material with a low flash point, such as elemental sulfur, is to be used it may be desirable to blanket the molten material with an inert gas to prevent flashing. In Example 3, rather than covering the sulfur with an inert gas the process was carried out at a lower temperature. The temperature of the molten sulfur was only 350–380° F. Sulfur is also easier to handle at this temperature because it becomes more viscous at higher temperatures. However, at the lower temperatures the vermiculite expansion was less complete and it was necessary to add 20 to 30% vermiculite to the molten sulfur on an end product weight basis, to provide for the substantially complete adsorption of the sulfur by the vermiculite.

It may be desirable in certain instances to operate at a relatively low temperature level using salts or other materials that are molten at that temperature level and yet produce a product including a material that is solid at the operating temperatures. This can be done by preparing the molten salt mix and expanding the vermiculite in the molten mix. After the vermiculite has adsorbed substantially all of the molten salts the material that is a solid at the operating temperature is thoroughly mixed into the molten mass. The molten salts adhering to the outer surface of the vermiculite particles appear to serve as a binder to bind the solid material to the outside of the vermiculite particles. The mass can be cooled and broken up as described above. In some instances it may be desirable to add the solids before the vermiculite is added.

The invention is similarly useful for combining materials that are too large to gain entrance between the platelets of the expanded vermiculite. These particles may be physically combined with the vermiculite particles by being bound to the particles by the molten material. In addition, urea formaldehyde can be used as an exterior coating to reduce the soluability of the product. This can be done by removing the plastic mass, including the molten salts and the vermiculite, from the melting vessel and after it has partially cooled, but while it is still plastic, thoroughly mixing the urea formaldehyde into the mass as the mass is broken up. Various other combinations of introducing materials between platelets and coating the outside of the exfoliated particles are also possible.

The following examples described without limiting the invention.

Example 1

A 22–22–0 fertilizer was prepared in the following manner. 1050 grams of ammoniu nitrate (35% N) and 720 grams of monoammonium phosphate (12–21–0) were added to a 5 liter stainless steel, round bottom melting vessel and heated to a temperature of about 450° F. The materials were a molten mass at this temperature. The molten salt mix was manually agitated in the melting vessel using a stainless steel spatula. 250 grams of unexpanded No. 3 vermiculite was added to the molten mass at a substantially constant rate over a period of 1 to 2 minutes while agitation was continued. The vermiculite submerged in the hot liquid immediately as it was added to the hot liquid mass.

The vermiculite adsorbed substantially all of the molten salt mix within 2 minutes after the completion of the vermiculite addition. The vermiculite salt mix mass was semi-solid, very pliable and workable. The vermiculite particles were expanded but appeared to retain their solid state and there appeared to be a sufficient coating of the molten salts on the outside of the particles to provide a lubricating effect between them.

The entire mass was scrapped out of the melting vessel after the salt was adsorbed by the vermiculite. The mass was placed on a smooth, flat stainless steel table top where it was manually broken up with the spatula as it cooled and hardened. The material was then screen through 8 and on 16 U.S. Standard screen size. A very small quantity of fines passed through the screen and was recovered and added to the melting vessel during the processing of a subsequent batch immediately after the completion of the vermiculite addition.

The vermiculite was expanded. The product had a density of about 50 lbs./cu. ft., was hard, relatively dust free, free flowing, exhibited substantially little effects from hygroscopicity when held in 2 ply paper bags for a period of 3 months and did not cake.

Example 2

A 22–10–10 fertilizer was prepared using the procedure of Example 1 except 985 grams of ammonium nitrate (35% N), 330 grams of monoammonium phosphate (12–61–0) and 455 grams of potassium nitrate (13–0–44) were added to the melting vessel.

The vermiculite adsorbed substantially all of the molten salt mix within 2 minutes after the completion of the vermiculite addition and the mass had substantially the same characteristics as the mass in Example 1.

The entire mass was scrapped out of the melting vessel, broken up and screened as in Example 1. A very small quantity of fines passes through the screen and was recovered and added to the melting vessel during the processing of a subsequent batch immediately after the completion of the vermiculite addition.

The vermiculite was expanded. The product had a density of about 50 lbs./cu. ft., was hard, relatively dust free, free flowing, exhibited substantially little effects from hygroscopicity when held in 2 ply paper bags for a period of three months and did not cake.

Example 3

A sulfur-vermiculite product was prepared that was suitable for agricultural use in fertilizers to supply elemental sulfur. The procedure of Example 1 was used except 800 grams of flowers of sulfur was added to the melting vessel and heated to a temperature of about 350–380° F. and 220 pounds of unexpanded No. 3 vermiculite was added to the molten mass at a substantially constant rate over a period of 1 to 2 minutes while the agitation was continued. The vemiculite submerged in the hot liquid immediately as it was added to the hot liquid mass.

The vermiculite adsorbed substantially all of the molten salt mix within 3 to 5 minutes after the completion of the vermiculite addition. The mass was similar to the mass of Example 1 but a little more liquid. It was still quite stiff and viscous.

The entire mass was scrapped out of the melting vessel, broken up and screened as in Example 1. A very small quantity of fines passed through the screen and was recovered and added to the melting vessel during the processing of a subsequent batch immediately after the completion of the vermiculite addition.

The vermiculite was expanded. The product had a bulk density of about 56.6 lbs./cu. ft., was hard, free flowing, exhibited substantially little effects from hygroscopicity when held in 2 play paper bags for a period of 3 months and did not cake. There was a slight tendency for the sulfur on the surface of the particles to crystallize and brush off as fine dust. However, the product could still be rated as relatively dust free when compared with most other sulfur containing materials.

Example 4

A 20–10–10 fertilizer was prepared in which the sulfate content was over 10% on an $SO_4$ weight basis. The procedure of Example 1 was used except 1040 grams of ammonium nitrate (35% N) and 330 grams of mono-ammonium phosphate (12–61–0) were added to the melting vessel. 255 pounds of unexpanded No. 3 vermiculite was added to the molten mass at a substantially constant rate over a period of 1 to 2 minutes while agitation was continued. The vermiculite submerged in the hot liquid immediately as it was added to the hot liquid mass. Substantially all of the molten salt mix was adsorbed by the vermiculite within 2 minutes after the completion of the vermiculite addition and the mass had substantially the same characteristics as the mass of Example 1.

The vermiculite had expanded. Then 400 pounds of sulfate of potash 0–0–50 was added to the plastic mass. The sulfate of potash is added separately because its melting point is about 2000° F. and the other salts become unstable at such a high temperature.

The entire mass was scraped out of the melting vessel, broken up and screened as in Example 1. A very small quantity of fines passed through the screen and was recovered and added to the melting vessel during the processing of a subsequent batch immediately after the completion of the vermiculite addition.

The product had a density of about 43 lbs./cu. ft., was hard, relatively dust free, free flowing, exhibited substantially little effects from hygroscopicity when held in 2 ply paper bags for a period of 3 months and did not cake. The sulfate of potash appears to be predominately adsorbed on the outer surface of the vermiculite.

SUMMARY OF THE INVENTION

Preheating unexpanded vermiculite under conditions such that the water content thereof is not decreased will result upon subsequent thermal expansion in a greater degree of expansion than previously possible. This occurs as applied to conventional dry expansion processes as well as to the liquid heat carrier expansion procedure described in extenso herein.

DESCRIPTION OF THE PREFERRED EMBODIMENTS

Within the broader scope of my invention, I have discovered a preferred method providing remarkable increases in the degree of expansion and the quantity of liquid taken up by the vermiculite.

If the vermiculite is preheated, that is, heated prior to mixing in the hot liquid heat carrier, while preventing any significant decrease in its water content, thereafter upon mixing it in the liquid, it will expand to a greater degree and also will take up greater quantities of the liquid heat carrier itself.

As stated above, the liquid heat carrier must be heated above 212° F. in order for expansion to occur. I have found, however, that for practical purposes, that is, for a degree of expansion that is commercially significant, the liquid heat carrier should be heated to a temperature of at least 325° F. and particularly from between about 400–650° F. There is no real upper temperature limit except as occasional by the nature of the liquid used.

In practicing the invention, the unexpanded vermiculite is preferably preheated to a temperature of between about 130° F. and 250° F., particularly from about 150–250° F. and especially at about 190° F. Maintenance of the water content of the vermiculite during the preheating is accomplished preferably by preheating in a saturated atmosphere. After preheating the verimculite is mixed into the hot liquid heat carrier, expanded therein, removed and drained. It is also advantageous to agitate the liquid while mixing and expanding the vermiculite therein in order to promote as direct and rapid exposure as possible to the hot liquid.

Substantial quantities of the hot liquid will be taken up by the vermiculite. In a further embodiment of the invention, it is possible to produce a very pure expanded form of vermiculite. This is done by expanding in a liquid heat carrier which has a boiling point somewhat above that at which expansion is to be performed whereby the temperature of the mixture can be raised after expansion of the vermiculite to boil off the liquid, yielding a pure expanded vermiculite. For example, if the desired expansion temperature is 500° F., a liquid heat carrier having a boiling point of 550° F., might be chosen so as to boil off as explained above. It might also be found advantageous to use a multi-component liquid system where one or more components are to be left with the vermiculite and the balance boiled off.

In fact, preheating vermiculite while maintaining the water content thereof will yield increased expansion even when performed with conventional dry expansion processes such as in hot gas furnaces.

With respect to controlling the water content of the vermiculite during preheating, it has been explained above that substantial decreases in the water content must be avoided. It has also been discovered that slight increases in the water content, up to about 1% is advantageous in expanding vermiculite and in the taking up of materials thereon.

The following examples demonstrate the advantages of the invention.

Example 1

One gallon of Wesson oil was heated to 500° F. A 100-gram quantity (about 75 cc.) of +65 mesh vermiculite at ambient temperature was mixed in the hot oil. While the vermiculite was being added, and thereafter, the oil was agitated in order to assure rapid and complete exposure of the vermiculite to the oil. The procedure was repeated with successive reduction of the initial oil temperature at 25° F. increments. The results are recorded in Table I showing the oil temperature before and after addition of the vermiculite, and the drained weight and volume of the expanded vermiculite and oil. As the oil temperature increases, the weight and volume of the product increases.

TABLE I

| Sample number | Initial oil temperature °F. | Final oil temperature °F. | Drained weight of vermiculite and oil, gm. | Volume of vermiculite and oil, cc. |
|---|---|---|---|---|
| 1 | 500 | 470 | 267.9 | 650 |
| 2 | 475 | 455 | 257.0 | 650 |
| 3 | 450 | 430 | 243.2 | 450 |
| 4 | 425 | 395 | 208.5 | 225 |
| 5 | 400 | 375 | 161.5 | 205 |
| 6 | 375 | 325 | 149.4 | 115 |
| 7 | 350 | 340 | 210.0 | 75 |

Example 2

Approximately 74–76 gram samples of 65 mesh vermiculite were preheated for about 3 minutes in a dry atmosphere. The preheat temperature of the samples was successively varied from 100–250° F. as shown in Table II. After removal from the preheat oven, the samples were mixed into and expanded in agitated oil at 500° F., removed and drained.

TABLE II

| Sample | Preheat temperature °F. | Oil temperature before, °F. | Oil temperature after, °F. | Drained weight of vermiculite and oil | Drained volume vermiculite and oil | Moisture loss, gram |
|---|---|---|---|---|---|---|
| A | 100 | 500 | 485 | 290.5 | 405 | --- |
| B | 130 | 500 | 485 | 323.5 | 485 | 0.2 |
| C | 150 | 500 | 485 | 316.4 | 480 | 0.3 |
| D | 190 | 500 | 485 | 305.2 | 460 | 0.3 |
| E | 220 | 500 | 480 | 301.8 | 380 | 0.3 |
| F | 250 | 500 | 470 | 280.7 | 310 | 0.3 |

Example 3

The procedure of Example 2 was repeated except that the preheat was performed in a saturated atmosphere. The vermiculite and the quantity of oil taken up by the vermiculite were generally quite high. In particular in the range from about 150° F. the weight and volume are superior to that of Table II in which preheating was performed in a dry atmosphere. The weight of all samples is higher than that of the 500° F. sample of Example 1 and the volume is higher at, at least 190° F. than the 500° F. sample of Example 1 and this is in spite of the fact that Example 1 is based on 100 gram samples, starting off with about 25 grams and about 19 cc. more than in Example III.

TABLE III

| Sample | Sample temperature, °F. | Oil temperature before, °F. | Oil temperature after, °F. | Drained weight of vermiculite and oil, gram | Drained volume of vermiculite and oil, cc. | Moisture loss, gram |
|---|---|---|---|---|---|---|
| A-A | Room | 500 | 475 | 304.1 | 445 | --- |
| B-B | 130 | 500 | 480 | 305.9 | 415 | --- |
| C-C | 150 | 500 | 485 | 337.0 | 610 | 0.1 |
| D-D | 190 | 500 | 485 | 334.7 | 650 | --- |
| E-E | 220 | 500 | 485 | 333.0 | 575 | 0.5 |
| F-F | 250 | 500 | 485 | 359.8 | 650 | 0.8 |

Graph A is a graphical representation of the results of Examples 1–3. In interpreting graph A it should be recalled that Example 1 utilized 100 gram samples while Example 2 and 3 utilized 75 gram samples. Comparison of the Table II weight and volume lines with the Table III weight and volume lines respectively points up the advantages of the preheat method over the conventional method.

Further aspects of the invention are illustrated by the following non-limiting Examples IV–XIV, the results of which are tabulated in Table IV.

Example 4

A 100 gram sample of Number 4 vermiculite concentrate was screened to remove all −65 mesh particles giving a predominant particle size of −20 to +65 mesh. The 100 gram sample had a volume of about 70 cc. The vermihulite was heated to 200° F. and maintained at that temperature until stable; about 5 minutes. The hot weight of the sample was 97.5 grams showing a weight loss of 2.5 grams.

Example 5

A sample of vermiculite identical to that in Example 4 was similarly heated to 210° F. It was poured fast into one gallon of Wesson oil which had been heated to 490° F. By fast pouring is meant that the vermiculite is poured at a rate faster than it can sink by itself into the oil so that it accumulates on the surface of the oil. By contrast, slow pouring is taken to mean that the particles are added at a rate to permit the vermiculite to submerge almost immediately in the hot fluid of its own accord without accumulation. The mixture was moderately stirred for several minutes after which it was removed and drained. The drained weight was 122.2 grams. Based on an estimated 10% moisture loss, which estimate is used consistently in these examples, the product has an oil/vermiculite ratio of .358:1. It had a 26.4% oil content. The drained volume was 77 cc. The vermiculite had hardly expanded at all and had taken up very little of the oil, with only slight interstitial adsorption.

Example 6

A 100 gram sample identical to that in Example 4 at ambient temperature of about 70° F. was poured slowly into one gallon of Wesson oil at a temperature of 500° F.

Example 7

Example 6 was repeated except that the vermiculite was poured fast into the hot oil. The vermiculite expanded to a volume of 400 cc. as compared with 240 cc. of Example 6. The oil content of the product was 64% as compared with 51% in Example 4.

Example 8

The procedure of Example 7 was repeated except the temperature of the unexpanded vermiculite was adjusted to from about 32 to about 40° F.

Example 9

The procedure of Example 8 was repeated with the exception that the temperature of the unexpanded vermiculite was adjusted as in Example 8.

Example 10

A 100 gram sample of vermiculite which had been treated by a process known as salt swelling was poured fast into a gallon of Wesson oil at 500° F. The salt swelling process results in an increase in the water content of the raw vermiculite by osmotic adsorption of water into chemical combination with the vermiculite crystals. The product after draining had a volume of 215 cc. and an oil content of 57.3%.

Example 11

A test comparative with Example 10 was run with the salt swell raw vermiculite poured slowly into an agitated mixture; the product after draining had a volume of 425 cc. and an oil content of 65.8%.

Example 12

The sample of Example 4 was pretreated by condensing steam into the vermiculite to a concentration of about 1% by weight of additional moisture. The vermiculite was poured fast into one gallon of Wesson oil at 500° F. The drained product has a volume of 610 cc. and an oil content of 73.7%.

Example 13

A sample comparative with Example 12 was run except that the pretreated vermiculite was poured fast into an agitated mixture. The drained product had a volume of 725 cc. and an oil content of 67.2%.

Example 14

A sample comparative with Example 12 was run except that the vermiculite was pretreated with about 2% additional moisture. It was poured fast into the 500° F. one gallon of Wesson oil and yielded a drained product of 90 cc. volume with an oil content of 35.3%.

TABLE IV

| Example | V | VI | VII | VIII | IX | X | XI | XII | XIII | XIV |
|---|---|---|---|---|---|---|---|---|---|---|
| Drained weight, grams | 122.2 | 183.6 | 248.5 | 205.2 | 214.8 | 210.1 | 262.5 | 340 | 273 | 139.0 |
| Drained volume, cc | 77 | 240 | 400 | 277 | 370 | 215 | 425 | 610 | 725 | 90 |
| Fat/vermiculite ratio | .358/1 | 1.04/1 | 1.76/1 | 1.23/1 | 1.39/1 | 1.34/1 | 1.92/1 | 2.8/1 | 2.04/1 | .545/1 |
| Percent fat | 26.4 | 51 | 64 | 54.5 | 56.5 | 57.3 | 65.8 | 73.7 | 67.2 | 35.3 |
| Agitated | | | | | | | | Yes | Yes | |
| Additional moisture, percent | | | | | | | | 1 | 1 | 2 |

The examples show that superior results are obtained when the liquid heat carrier is agitated while the vermiculite is added and expanded therein. They also show superior results when up to about 1% additional water is added to the unexpanded vermiculite which was performed in this case by condensation of steam.

While in accordance with the patent statutes, I have described what at present is considered to be the preferred embodiment of this invention, it will be obvious to those skilled in the art that various changes and modifications may be made therein without departing from the present invention, and I, therefore, aim in this description to cover all such equivalent variations as fall within the true spirit and scope of this invention.

What is claimed is:

1. The process of expanding vermiculite comprising; preheating to a temperature above room temperature unexpanded vermiculite in an atmosphere saturated with water under conditions which prevent any significant escape of water from the unexpanded vermiculite; thermally expanding the heated vermiculite.

2. The process of claim 1 wherein the unexpanded vermiculite is preheated to about 130–250° F.

3. The process of claim 2 wherein the unexpanded vermiculite is preheated to about 150–250° F.

4. The process of claim 3 wherein the unexpanded vermiculite is preheated to about 190° F.

5. The process of claim 1 wherein the vermiculite is expanded in a liquid heat carrier.

6. The process of claim 5 wherein the liquid heat carrier is at a temperature above about 325° F.

7. The process of claim 6 wherein the liquid heat carrier is at a temperature in the range of about 400–650° F.

8. The process of claim 7 wherein the liquid heat carrier is oil.

References Cited

UNITED STATES PATENTS

| | | | |
|---|---|---|---|
| 1,963,275 | 6/1934 | Labus | 252—378 |
| 1,972,390 | 9/1934 | Miner | 252—378 |
| 2,621,034 | 12/1952 | Stecker | 252—378 X |

REUBEN FRIEDMAN, Primary Examiner

R. BARNES, Assistant Examiner

U.S. Cl. X.R.

71—62, 64 G